United States Patent

[11] 3,625,850

[72] Inventor James R. Arrington
W203 S10630 North Shore Drive,
Muskego, Wis. 53150
[21] Appl. No. 11,659
[22] Filed Feb. 16, 1970
[45] Patented Dec. 7, 1971

[54] SENSING DEVICE FOR FLUID MEDIA
10 Claims, 3 Drawing Figs.

[52] U.S. Cl.................................................. 204/195,
324/29, 324/30 R
[51] Int. Cl............................................G01n 37/30
[50] Field of Search............................... 324/30 R,
30 B, 29; 204/1 T, 195 R, 195 G, 195 H, 195 M,
195 L, 195 W, 195 S, 195 P, 195 F, 195 T, 195 C,
195 B

[56] References Cited
UNITED STATES PATENTS
3,246,235 4/1966 Alisopp........................ 324/29

OTHER REFERENCES
Beckman Bulletin 86- G, received in Patent Office Feb. 20, 1951, pp. 24 and 25. Copy in 324/30.

Primary Examiner—G. L. Kaplan
Attorneys—William A. Denny and Neil E. Hamilton

ABSTRACT: A device for sensing electrochemical conditions in a fluid media which permits the sensing electrodes to be selectively exposed to or protected from the fluid media. The device is equipped with means to deliver accessory agents such as cleaning solutions, buffering solutions and cleaning water and a cup assembly is provided at the end of the probe to seal off the electrodes from the surrounding media so that the electrodes can be cleaned and calibrated.

PATENTED DEC 7 1971
3,625,850
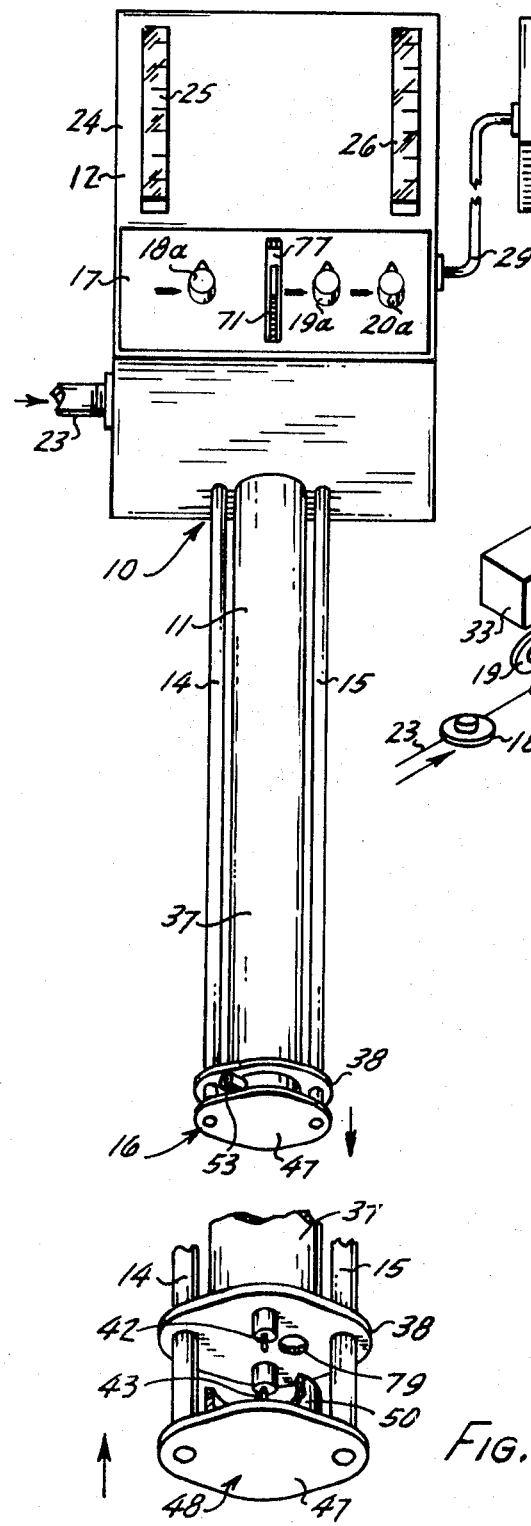
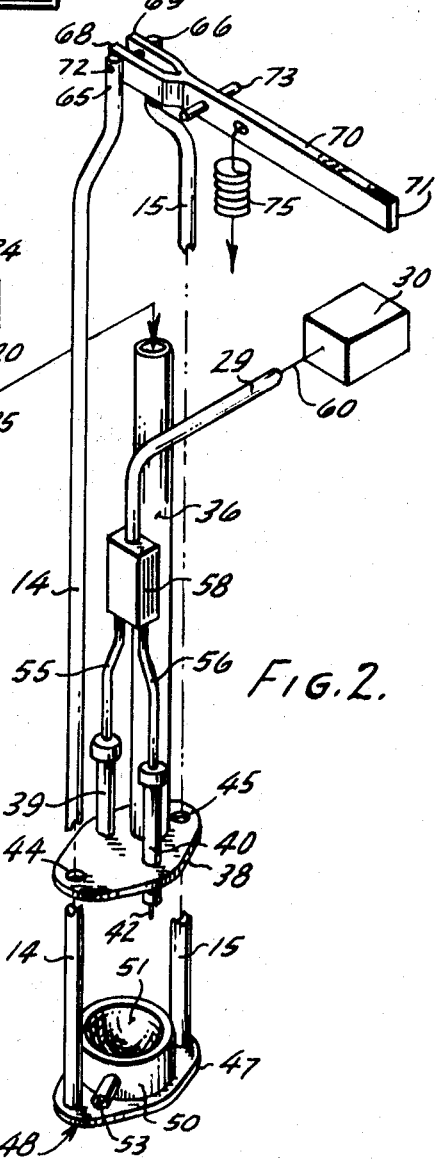
FIG. 1.
FIG. 2.
FIG. 3.
INVENTOR.
JAMES R. ARRINGTON
BY
Neil C. Hamilton
ATTORNEY.

3,625,850

SENSING DEVICE FOR FLUID MEDIA

BACKGROUND OF THE INVENTION

Measuring devices presently in use which are employed to measure chemical conditions in fluids such as a pH meter have disadvantages when used in measuring the conditions of liquids such as sewage in that the electrodes become contaminated with materials such as hair, oil, or other water insoluble heavy waste materials. Some of the presently used measuring devices obtain a sample of the liquid to be measured by conveying it to the pH meter. However, this has the disadvantage in that the pH value cannot be used to continuously monitor a process. Where the meter is kept in continuous contact with the fluid, the previously mentioned problem of contaminating arises with the additional problem of having the pH probes shift in calibration when they are removed for cleaning or becoming damaged when moved for calibration.

The types of units concerned with this invention and which are subject to fouling because of contamination with foreign substances are described in U.S. Pat. Nos. 2,870,078; 3,000,805 and 3,218,242. These devices are also subject to the previously described problems concerning calibration shifting and damage.

It is an object of the present invention to provide a novel sensing device which is easily maintained and is designed to give accurate readings under severe conditions. It is another object of this invention to provide a sensing device which is designed to be utilized in continuous contact with a fluid media. It is still another object for the present invention to provide a sensing device wherein a sample can be maintained in contact with the sensing electrodes. It is yet another object of this invention to provide a pH sensing device which contains means for cleaning and calibrating the electrodes.

SUMMARY OF THE INVENTION

The foregoing objects are accomplished and the shortcomings of the prior art are overcome by the present sensing device which is comprised of a probe adapted to be placed in a fluid media and a control and accessory portion which is located above the media. Two electrodes are carried internally of the probe and the probe is constructed with means to expose the electrodes to the fluid media in one instance and to prevent further communication with the media in another. The means to expose the electrodes and prevent further communication with the fluid media are operable from a point remote from the exposure. The probe is constructed and arranged with a sensing portion and a cup member in the movable end portion of the probe which serves as a means of trapping a portion of the fluid. The cup has an outlet for cleaning solution and rinse water to flow outwardly from the probe during a cleaning operation.

BRIEF DESCRIPTION OF DRAWINGS

A better understanding of the present sensing device will be accomplished by reference to the drawing wherein:

FIG. 1 is a perspective view of the sensing device interconnected with a control box.

FIG. 2 is a view of the probe portion of the device of FIG. 1 with the probe casing removed to show the electrodes and utility conduit, and partially in diagrammatic view showing the accessories for the sensing device.

FIG. 3 is a partial view of the lower section of the probe shown in FIG. 1 with the bottom portion in an open position.

DESCRIPTION OF THE PREFERRED EMBODIMENT

Proceeding to a detailed description of the present invention, the sensing device generally 10 is composed of a probe portion 11 and a combined control and reservoir portion 12. Two outwardly disposed rod members 14 and 15 extend between the control portion 12 and the bottom cup assembly 16 and laterally of the probe 11.

The control and reservoir portion 12 contains a lower control panel 17 with valve control knobs 18a, 19a and 20a disposed on valves 18, 19 and 20 respectively. Valve 18 is in contact with water inlet pipe 23 while valve 19 controls the flow of a cleaner solution contained within tank 33 in the reservoir portion 24. The contents of the cleaner solution is indicated by the sight level gauge 25. In a similar manner, valve 20 monitors the flow of a buffering solution contained in another tank 34 in the reservoir section 24, the level of which is indicated by sight level gauge 26. Communicating with the side of the control panel 17 is an electrical-type cable 29 which leads ultimately to a control box 30 which is of the constant and permanent recording type and in this instance is a Rustrack Model 288 Recorder manufactured by Gulton Industries.

As best shown in FIG. 2 cleaner tank 33 and buffer tank 34 as well as water inlet 23 communicate through a common line 35 and downwardly through a common pipe 36 which is disposed inwardly of tubular casing 37 of probe 11. Common pipe 36 is secured at its lower end in electrode holding plate 38 which also secures two electrode assemblies 39 and 40 with protruding electrodes 43 and 42, respectively, as best shown in FIG. 3. Electrodes assemblies 39 and 40 are standard pH sensing electrodes and are manufactured by Corning Glass Works under model number 476022.

Slidingly disposed through electrode holding plate 38 are two oppositely positioned holes 44 and 45 for accommodating rods 14 and 15 respectively. The rods 14 and 15 ultimately terminate in and are secured in an end plate 47 of cup assembly 48. Positioned centrally on the end plate is a cup member 50 having the same internal and outer diameter as casing 37. The bottom internal portion of the cup member 50 is concave in configuration as indicated by the number 51. An outlet tube 53 is disposed in cup member 50 and provides communication between the inside of the cup and the outside.

Conductive cables 55 and 56 interconnect electrodes 39 and 40 with a preamplifier 58 which is encapsulated in plastic to prevent the entry of moisture. A signal and power cable 60 is connected at one end to the control box 30 and at the other end to preamplifier 58 through conduit 29.

Rod numbers 14 and 15 and consequently cup assembly 48 are moved upwardly and downwardly by means of a connection afforded by inwardly disposed leg portions 65 and 66 between which are positioned the leg portions 68 and 69 of a Y-shaped handle member 70. A pivotal connection is provided by pin 72 and in a like manner handle member 70 is pivotally secured inside the control section 17 by means of pivot pin 73 in the usual manner. The handle 70 is spring tensioned inside the control section 17 by a spring 75 which is secured within the control box 12. A longitudinal slot 77 in control portion 17 affords movement of handle member 70 up and down within the control box and is operable from outside of it.

OPERATION

A better understanding of the advantages of the sensing device 10 will be had by a description of its operation. The sensing device is mounted on or near a tank or through in which the fluid to be measured is contained. The casing 37 is immersed in the solution so that at least the electrode mounting plate 38 is below the surface. With the casing 37 so lowered the cup assembly 48 is placed in the lowered or opened position by raising the handle 71 so as to expose the electrodes 42 and 43 in the solution to be measured. The concave configuration of the cup assembly is such that it does not become fouled and even if fouling should occur, enough circulation remains so that accurate measurements are obtained. When waste material such as hair, oil, or sludge comes into contact with the electrodes 42 and 43 they are easily cleaned and recalibrated by the following procedure: Water valve 18 is opened and water under pressure from a common source (not shown) flows through conduit 23 and common conduit 36 inside casing 37 through an opening 79 in the electrode mounting plate 38. The water jet thus formed washes away any hair or other waste material which may be clinging in the cup 50 or on the electrodes 42 and 43. After the previously washing procedure, the cup assembly 48 is closed, by lowering handle 71. As the cup assembly 50 closes against the bottom of mounting plate 38 the specially designed channel 51 in the cup assembly guides the water jet over the electrodes and out of tube 53. This creates a good cleaning action in the electrode area. The relief tube 53 may be vented to the surrounding solution or be extended up the casing 37 to an external drain. In some instances it is important to close the cup assembly 48 before the washing procedure so as not to contaminate the surrounding solution being measured.

The cleaner valve 19 is next turned on and an appropriate cleaning solution such as concentrated muriatic acid then flows through the common conduit 36 and into cup 50 to chemically clean the electrodes 42 and 43. Cleaner valve 19 is subsequently closed and the cleaning solution remaining in the cup assembly 50 is washed out by momentarily opening the water valve 18. The next step is to introduce a buffering solution into the cup 50 which is effected by opening valve 20 and allowing the buffering solution to flow from tank 34 down through conduit 36 into the cup 50. The calibration takes place by turning a potentiometer located in the control box 30 and adjusting it until the meter on the control box reads the value of the buffer solution. This completes the cleaning and calibration of the device 10 and the electrodes 42 and 43 are again exposed to the solution to be measured by raising handle 71, and lowering cup assembly away from mounting plate 38.

In applications where pH is changing with time, a sample may be trapped by raising the cup. This allows end points and rates to be measured and has been found very useful in practice. The device affords a means of isolating the electrodes 42 and 43 so that the cleaning and calibration may be accomplished without disturbing them. This results in less off-line time, reduced probe failure, more consistent results, lower service and maintenance costs and lower skill requirements of the operator.

Casing 37, pull rods 14 and 15, outlet tube 53 and mounting plate 38 are composed of polyvinyl chloride resinous plastic. However, other suitable materials such as ABS plastic could be used in their place. Electrode assemblies 39 and 40 with electrodes 42 and 43 are of the pH type but any suitable sensing electrodes such as oxygen reduction potential or any specific ion electrode can be substituted. The same is true of the preamplifier which is indicated as being of the encapsulated type. Other amplifiers of appropriate construction can be used. While a control box 30 of the continuous recording type containing a potentiometer is described as being a Rustrack Model 288, other strip chart or circular types can be utilized.

In the device 10, the tanks and valving have been shown as being disposed in a unitary control and reservoir section 12. If desired, the tanks and valving could be mounted as a separate unit with usual conduits interconnecting with the mounting plate 38. The lower casing 37 or tube assembly can be made to any convenient length. While the valves 18, 19 and 20 for the various accessories have been shown as being operable in a manual manner, these could be electrically operated valves instead and the handle 70 could be replaced by a solenoid-operated lever.

While the present device is described as being operable with two electrodes 42 and 43 it will be readily apparent that a single electrode can be employed with the same advantages concerning washing, calibration and sampling.

It will thus be seen that through the present invention that is now provided a pH-type sensing device which can be readily cleaned and calibrated without substantial interruption in service. The present sensing device is operable under adverse and extreme conditions yet will give a continuous reading irrespective of the type of contaminants which are contained in the solution. The novel sensing device is simple in its construction and can be readily manufactured from parts which are available on the open market. The device affords a means of selectively capturing a sample for analysis and also provides for a cleaning and adjustment which heretofore required long periods of time. Further, a high degree of skill is not required to operate the pH sensing device 10 yet accurate readings can be obtained in various types of fluid environment.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A device for sensing electrochemical conditions in a fluid media comprising a probe adapted to be placed in said media, at least one electrode carried internally of said probe and means to expose said electrode to said fluid media in one instance and to enclose said electrode and to prevent further communication with said media in another instance, said means to expose said electrode and to prevent further communication with said media being operable from a point remote from said exposure.

2. The device as defined in claim 1 wherein said means to expose said electrode and to enclose said electrode and to prevent further communication with said media is a movable end portion of said probe constructed and arranged to move outwardly away from the ends of said electrode.

3. The device as defined in claim 2 wherein said means to expose said electrode and to prevent further communication with said media remote from said exposure includes rod members connected at one end to said means to expose said electrode and further includes actuation means at the opposite ends of said rods.

4. The device as defined in claim 3 further including a reservoir for accessory agents, means to deliver said agents to the exposed ends of said electrode and a housing for said reservoir disposed at the end of said probe opposite said movable portion.

5. The device as defied in claim 4 further including connection means carried by said housing for connecting a recording means remote from said housing and further including amplifying means connected to said electrode and disposed within said housing of said probe.

6. The device as defined in claim 2 further including a cup member disposed in said movable end portion constructed and arranged with the concave portion adjacent to the ends of said electrode.

7. The device as defined in claim 6 further including an outlet in said movable end portion and in communication with the said cup member.

8. The device as defined in claim 1 further including means to deliver accessory agents to the exposed portions of said electrode.

9. The device as defined in claim 8 wherein said means to deliver accessory agents is a conduit disposed internally of said probe.

10. The device as defined in claim 1 wherein said means to expose said electrode and to enclose said electrode and to prevent further communication with said media is a movable end portion of said probe.

* * * * *